(12) United States Patent
Benjamin et al.

(10) Patent No.: US 11,681,971 B2
(45) Date of Patent: Jun. 20, 2023

(54) RAPID EXPLORATION OF BUILDING DESIGN OPTIONS FOR VENTILATION

(71) Applicant: AUTODESK, INC., San Francisco, CA (US)

(72) Inventors: David Benjamin, Brooklyn, NY (US); Damon Lau, New York, NY (US); James Stoddart, Atlanta, GA (US); Lorenzo Villaggi, Brooklyn, NY (US); Rui Wang, New York, NY (US); Lindsey Wikstrom, West New York, NJ (US)

(73) Assignee: AUTODESK, INC., San Francisco, CA (US)

( * ) Notice: Subject to any disclaimer, the term of this patent is extended or adjusted under 35 U.S.C. 154(b) by 0 days.

(21) Appl. No.: 17/098,282

(22) Filed: Nov. 13, 2020

(65) Prior Publication Data

US 2021/0150109 A1    May 20, 2021

Related U.S. Application Data

(60) Provisional application No. 62/937,190, filed on Nov. 18, 2019.

(51) Int. Cl.
*G06Q 10/06* (2012.01)
*G06Q 10/04* (2012.01)
(Continued)

(52) U.S. Cl.
CPC ... *G06Q 10/06393* (2013.01); *G06F 16/9024* (2019.01); *G06F 30/13* (2020.01); *G06F 30/18* (2020.01); *G06F 30/20* (2020.01); *G06F 30/28* (2020.01); *G06Q 10/047* (2013.01); *G06Q 10/067* (2013.01); *G06Q 10/0633* (2013.01); *G06Q 10/06375* (2013.01);
(Continued)

(58) Field of Classification Search
None
See application file for complete search history.

(56) References Cited

U.S. PATENT DOCUMENTS 8,005,656 B1    8/2011    Ankory et al.
8,229,176 B2    7/2012    Seegers et al.
(Continued)

FOREIGN PATENT DOCUMENTS

KR    2015-0125457 A    11/2015

OTHER PUBLICATIONS

Murakami, Yuki, et al. "Coupled simulations of indoor-outdoor flow fields for cross-ventilation of a building in a simplified urban array." Atmosphere 9.6 (2018): 217.*
(Continued)

*Primary Examiner* — Ryan M Gray
(74) *Attorney, Agent, or Firm* — Artegis Law Group, LLP (57) ABSTRACT

A computer-implemented method for computationally determining ventilation efficiency when generating a building design comprises: generating a first three-dimensional (3D) mesh based on a first 3D building model; performing a first fluid dynamic computer simulation based on the first 3D mesh and first environmental data associated with the first 3D building model to generate a first output data set; and computing, based on the first output data set, a first value for a ventilation performance metric that is associated with the first 3D building model.

20 Claims, 5 Drawing Sheets

(51) Int. Cl.

| | | |
|---|---|---|
| *G06F 30/13* | (2020.01) | |
| *G06Q 10/10* | (2012.01) | |
| *G06F 16/901* | (2019.01) | |
| *G06Q 50/16* | (2012.01) | |
| *G06F 30/20* | (2020.01) | |
| *G06F 30/28* | (2020.01) | |
| *G06F 30/18* | (2020.01) | |
| *G06Q 50/08* | (2012.01) | |
| *G06T 17/20* | (2006.01) | |
| *G06F 111/04* | (2020.01) | |
| *G06F 111/02* | (2020.01) | |
| *G06F 111/10* | (2020.01) | |
| *G06F 119/02* | (2020.01) | |
| *G06Q 10/0639* | (2023.01) | |
| *G06Q 10/0633* | (2023.01) | |
| *G06Q 10/047* | (2023.01) | |
| *G06Q 10/101* | (2023.01) | |
| *G06Q 10/0637* | (2023.01) | |
| *G06Q 10/067* | (2023.01) | |

(52) U.S. Cl.
CPC ..... *G06Q 10/06395* (2013.01); *G06Q 10/101* (2013.01); *G06Q 50/08* (2013.01); *G06Q 50/163* (2013.01); *G06Q 50/165* (2013.01); *G06F 2111/02* (2020.01); *G06F 2111/04* (2020.01); *G06F 2111/10* (2020.01); *G06F 2119/02* (2020.01); *G06T 17/20* (2013.01)

(56) References Cited

U.S. PATENT DOCUMENTS

| | | | |
|---|---|---|---|
| 8,594,701 B2 | 11/2013 | Pakzad | |
| 8,744,812 B2* | 6/2014 | Cruz | G06F 13/105 703/2 |
| 9,285,227 B1 | 3/2016 | Chao et al. | |
| 9,501,805 B2 | 11/2016 | McLean | |
| 10,387,811 B2 | 8/2019 | Carnevale et al. | |
| 10,691,081 B2 | 6/2020 | Ray et al. | |
| 10,831,941 B2 | 11/2020 | Desai et al. | |
| 10,917,740 B1 | 2/2021 | Scott et al. | |
| 10,943,210 B2 | 3/2021 | Hance et al. | |
| 11,209,798 B1 | 12/2021 | Michalowski et al. | |
| 11,263,363 B2 | 3/2022 | Gifford | |
| 11,271,222 B2* | 3/2022 | Dede | G06F 30/23 |
| 11,272,316 B2 | 3/2022 | Scott et al. | |
| 2004/0034555 A1 | 2/2004 | Dismukes et al. | |
| 2004/0078257 A1 | 4/2004 | Schweitzer et al. | |
| 2004/0113945 A1 | 6/2004 | Park et al. | |
| 2006/0217876 A1 | 9/2006 | Houri et al. | |
| 2009/0300174 A1 | 12/2009 | Floris et al. | |
| 2010/0198563 A1 | 8/2010 | Plewe | |
| 2010/0218131 A1 | 8/2010 | Holm-Petersen et al. | |
| 2012/0072181 A1* | 3/2012 | Imani | G06F 30/13 703/1 |
| 2012/0096417 A1 | 4/2012 | Durbha et al. | |
| 2013/0073344 A1 | 3/2013 | Parent | |
| 2013/0197799 A1 | 8/2013 | Cho et al. | |
| 2014/0278280 A1 | 9/2014 | Pardo-Fernandez | |
| 2016/0012357 A1 | 1/2016 | Wood | |
| 2016/0012359 A1 | 1/2016 | Wood | |
| 2016/0161263 A1 | 6/2016 | Patel | |
| 2018/0047121 A1 | 2/2018 | Bhattacharyya | |
| 2018/0068255 A1 | 3/2018 | Hance et al. | |
| 2018/0094936 A1 | 4/2018 | Jones et al. | |
| 2018/0137214 A1 | 5/2018 | Benjamin et al. | |
| 2018/0288850 A1 | 10/2018 | Kumar et al. | |
| 2018/0300435 A1 | 10/2018 | Eckman et al. | |
| 2018/0364719 A1 | 12/2018 | Wang et al. | |
| 2018/0365347 A1 | 12/2018 | Wang et al. | |
| 2019/0026949 A1 | 1/2019 | Alabastro et al. | |
| 2019/0102486 A1 | 4/2019 | Desai et al. | |
| 2019/0188338 A1 | 6/2019 | Srivastava et al. | |
| 2019/0347367 A1 | 11/2019 | Livnat | |
| 2019/0354641 A1 | 11/2019 | Masoud et al. | |
| 2020/0034503 A1 | 1/2020 | Livnat | |
| 2020/0104431 A1* | 4/2020 | Ginsberg | G06F 30/25 |
| 2020/0272956 A1 | 8/2020 | Livnat | |
| 2020/0311320 A1 | 10/2020 | Wang et al. | |
| 2021/0073449 A1 | 3/2021 | Segev et al. | |
| 2022/0007601 A1 | 1/2022 | Coffin et al. | |

OTHER PUBLICATIONS

Chen, Jun, Zhengqi Gu, and Yiping Wang. "Numerical Simulations of Noise Induced by Flow in HVAC Ventilation Ducts." SAE International Journal of Materials and Manufacturing 4.1 (2011): 696-707.*
International Search Report for application No. PCT/US2020/060861 dated Feb. 11, 2021.
Final Office Action received for U.S. Appl. No. 17/098,214 dated Jun. 1, 2022, 40 pages.
Dorismond, Jessica, "Supermarket Optimization: Simulation Modeling and Analysis of a Grocery Store Layout", University at Buffalo, State University of New York, 2016, pp. 3656-3657.
Ozgormus, Elif, "Optimization of Block Layout for Grocery Stores", Auburn University, 2015, pp. 134 pages.
Bhadury et al., "Store Layout Using Location Modeling To Increase Purchases", University of North Carolina at Greensboro, 2016, pp. 1-32.
Non Final Office Action received for U.S. Appl. No. 17/098,214 dated Feb. 18, 2022, 23 pages.
Rubin, Arthur, "Office Design Measurements for Productivity—A Research Overview", U.S. Department of Commerce, Dec. 1987, 78 pages.
Ranne et al., "People Flow Experience in Offices", A handbook for planning office spaces Kone Corporation, 2017, 24 pages.
Autodesk, "Factory Design Suite 2011", Accelerate your Factory Layout Process, 2011, 4 pages.
Tachikawa et al., "Office Layout Support System using Genetic Algorithm—Generation of Layout Plans for Polygonal Space-", 2010 Second World Congress on Nature and Bilogically Inspired Computer, Dec. 15-17, 2010, pp. 280-285.
Li et al., "A Constraint Based Generative System for Floor Layout Computer Science", 2000, pp. 417-426.
Anderson et al., "Augmented Space Planning: Using Procedural Generation to Automate Desk Layouts", International Journal of Architectural Computing, vol. 16, No. 2, 2018, pp. 164-177.
Non Final Office Action received for U.S. Appl. No. 17/098,214 dated Sep. 19, 2022, 24 pages.
Seppanen et al., "Facilities Planning with Graph Theory", Management Science, vol. 17, No. 4, Dec. 1970, pp. B-242-B253.
Nagy, Danil, "Routing with graphs", Generative Design, Mar. 2, 2018, 14 pages.
Liggett, Robin S., "Automated facilities layout: past, present and future" Automation in Construction, vol. 9, 2000, pp. 197-215.
Homayouni, Hoda, "A Survey of Computational Approaches to Space Layout Planning (1965-2000)", 2007, 18 pages.
Bahrehmand et al., "Optimizing Layout using Spatial Quality Metrics and User Preferences", Graphical Models, vol. 93, 2017, pp. 25-38.
Watson, Kelvin, "Graph Theoretic Facility Layout Design and Evaluation: Theoretical and Practical Considerations", Jan. 1996, 369 pages.
Non Final Office Action received for U.S. Appl. No. 17/098,287 dated Aug. 22, 2022, 45 pages.
Bassett et al., "Municipal Zoning Enabling Act", Floor Area Ratio, Jun. 1958, 28 pages.
Osman et al., "A Hybrid CAD-based Construction Site Layout Planning System using Genetic Algorithms", Automation in construction, vol. 12, No. 6, 2003, pp. 749-764.
Non Final Office Action received for U.S. Appl. No. 17/098,291 dated Sep. 16, 2022, 60 pages.
Flack et al., "Evolution of Architectural Floor Plans", European conference on the applications of evolutionary computation, 2011, pp. 313-322.

(56) References Cited

OTHER PUBLICATIONS

Cascio et al., "Residential Building Retrofit through Numerical Simulation: A Case Study", Energy Procedia, vol. 111, 2017, pp. 91-100.

Koenig et al., "Comparing two evolutionary algorithm based methods for layout generation: Dense packing versus subdivision", AI EDAM, vol. 28, No. 3, 2014, pp. 285-299.

Almhafdy et al., "Courtyard Design Variants and Microclimate Performance", Procedia—Social and Behavioral Sciences, https://doi.org/10.1016/j.sbspro.2013.07.190, vol. 101, 2013, pp. 170-180.

Non Final Office Action received for U.S. Appl. No. 17/098,280 dated Nov. 3, 2022, 38 pages.

Azhar et al., "Building Information Modeling for Sustainable Design and LEED® Rating Analysis", Automation in Construction, vol. 20, No. 2, 2010, pp. 217-224.

Final Office Action received for U.S. Appl. No. 17/098,287 dated Dec. 2, 2022, 34 pages.

Final Office Action received for U.S. Appl. No. 17/098,214 dated Jan. 9, 2023, 33 pages.

Final Office Action received for U.S. Appl. No. 17/098,291 dated Jan. 26, 2023, 46 pages.

Final Office Action received for U.S. Appl. No. 17/098,280 dated Mar. 6, 2023, 33 pages.

Soltani et al., "A fuzzy based multi-objective path planning of construction sites", Automation in construction 13 (2004) 717-734, Apr. 9, 2004.

Non Final Office Action received for U.S. Appl. No. 17/098,228 dated Mar. 23, 2023, 65 pages.

Non Final Office Action received for U.S. Appl. No. 17/098,214 dated Apr. 17, 2023, 35 pages.

\* cited by examiner

RAPID EXPLORATION OF BUILDING DESIGN OPTIONS FOR VENTILATION

CROSS-REFERENCE TO RELATED APPLICATIONS

This application claims priority benefit of the United States Provisional patent application titled, "COMPUTER-IMPLEMENTED TECHNIQUES FOR DESIGNING FACTORIES AND WORK SPACES," filed on Nov. 18, 2019 and having Ser. No. 62/937,190. The subject matter of this related application is hereby incorporated herein by reference.

BACKGROUND

Field of the Various Embodiments

The present invention relates generally to computer science and computer-aided design and, more specifically, to computer-implemented techniques for rapidly exploring multiple building design options to optimize natural ventilation and reduce energy consumption.

Description of the Related Art

Generating a building design and layout, such as for a factory or workplace, oftentimes is a complex process where many different design goals as well as numerous constraints and requirements must be considered. For example, when designing a factory or other similarly intricate industrial building, a designer has to consider, among other things, operating requirements, production requirements, architectural and engineering constraints, cost constraints, and building site constraints.

With respect to the operating requirements of a typical industrial building, the mechanical cooling loads experienced during high-temperature or "hot" seasons are a primary contributor to the operating cost and carbon footprint of the building. Accordingly, the use of passive cooling systems, such as natural ventilation, oftentimes is a design consideration. When designing such a building, simulation methods, such as computational fluid dynamics simulations, that are incorporated into computer-aided design (CAD) software are typically used by a designer to model and simulate airflow and heat transfer of the building prior to construction. In this way, the designer can assess the effectiveness of passive cooling systems within the building in reducing overall mechanical cooling loads.

One drawback to using conventional CAD software when designing industrial buildings is that much of the information needed to properly model and simulate the airflow and heat transfer of a building via the simulation methods incorporated into conventional CAD software is not available or determined until the end of the building design process. Examples of such information include, without limitation, the thermal properties of building materials, the layouts of rooms and corridors within the building, the locations and sizes of air inlets and outlets throughout the building, and the capacities of different mechanical cooling systems within the building. Thus, a designer using conventional CAD software is usually unable to model airflow and heat transfer of a building, including the airflow and heat transfer related to natural ventilation, until very late in the design process, when the types of adjustments that can be made to the building design as well as the amounts of those adjustments are severely limited. For example, while changing the size or location of a corridor within a building could improve the airflow through the corridor, making such a change at the end of the design process likely would not be possible without significantly redesigning much of the building layout. Similarly, modifying the sizes and/or positions of the air inlets and air outlets throughout a building could enhance overall natural ventilation, but such modifications likely would involve structural changes that would require substantial building redesign. As a result, the ventilation systems found in industrial buildings, including the related natural ventilation systems, typically fail to provide optimal levels of ventilation efficiency for those buildings.

In addition, because only a limited range of changes and modification is usually possible when designing the ventilation system in an industrial building using conventional CAD software, only a limited number of designs for the ventilation system can be explored relative to an overall design space where ventilation efficiency is balanced against other performance metrics for the building. Consequently, very few, if any of the ventilation design solutions generated using conventional CAD software provide optimal levels of ventilation efficiency for industrial buildings.

As the foregoing illustrates, what is needed in the art are more effective techniques for generating designs for ventilation systems in buildings.

SUMMARY

One embodiment of the present application sets forth a computer-implemented method for determining ventilation efficiency of a specific building design. The method includes generating a first three-dimensional (3D) mesh based on a first 3D building model; performing a first fluid dynamic computer simulation based on the first 3D mesh and first environmental data associated with the first 3D building model to generate a first output data set; and computing, based on the first output data set, a first value for a ventilation performance metric that is associated with the first 3D building model.

At least one technical advantage of the disclosed techniques relative to the prior art is that the disclosed techniques can be incorporated into a CAD application to enable the CAD application to automatically explore a design space to identify regions where the ventilation efficiency of a building is optimized against other performance metrics for the building. Accordingly, with the disclosed techniques, a CAD application can generate a substantially larger number of building designs that, for example, increase both the natural ventilation within the building and the overall energy efficiency of the building, relative to a conventional CAD application. This functionality, which is not available in conventional CAD applications, increases the likelihood that an optimal ventilation system design can be automatically generated and identified for a given building design. These technical advantages represent one or more tangible and meaningful technological improvements over conventional CAD applications.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

In the following description, numerous specific details are set forth to provide a more thorough understanding of the various embodiments. However, it will be apparent to one of skilled in the art that the inventive concepts may be practiced without one or more of these specific details.

Figure 1:
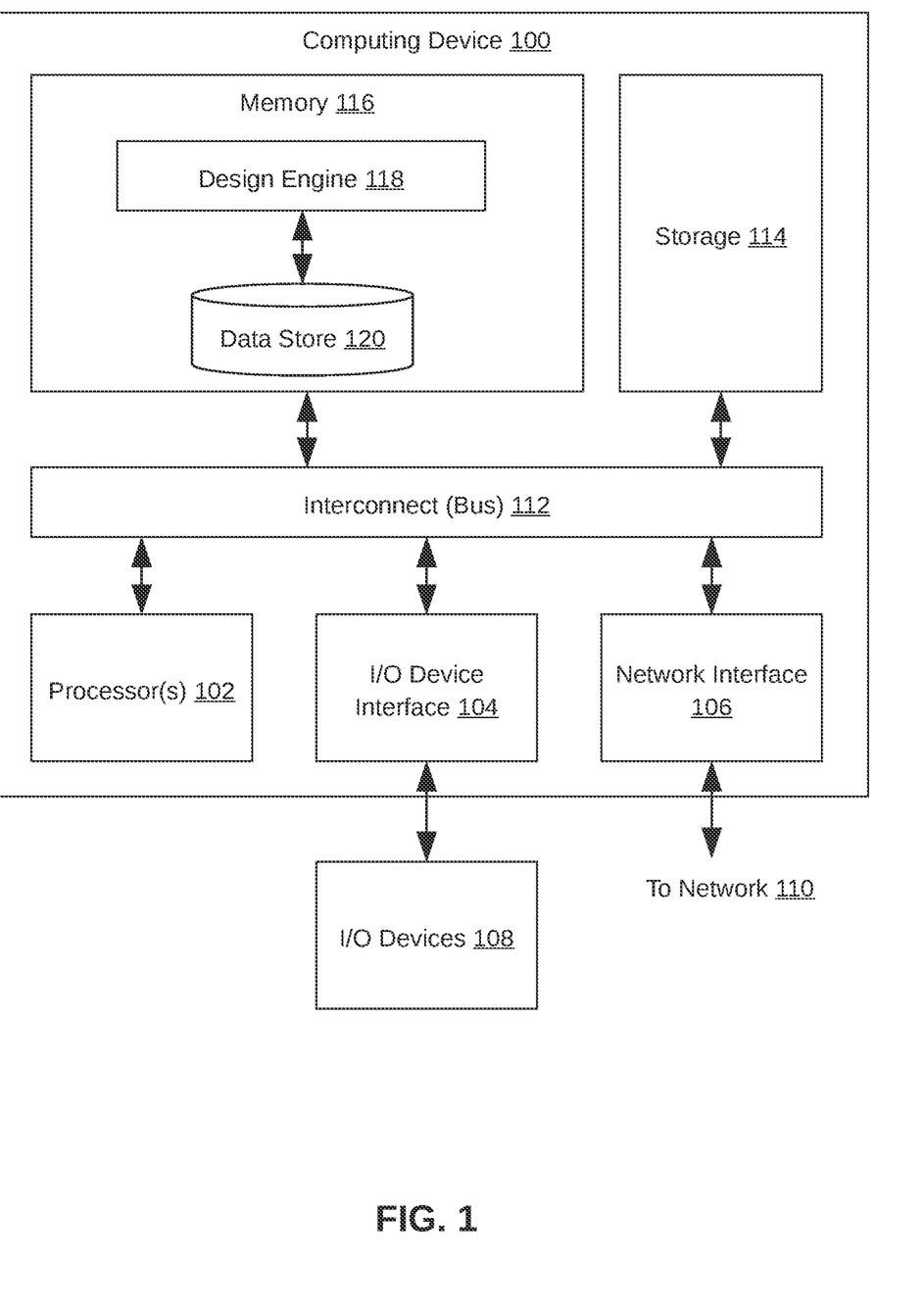
FIG. 1 is a conceptual illustration of a computing system configured to implement one or more aspects of the present disclosure.

FIG. 1 illustrates a computing device 100 configured to implement one or more aspects of the present disclosure. As shown, computing device 100 includes an interconnect (bus) 112 that connects one or more processing units 102, an input/output (I/O) device interface 104 coupled to one or more input/output (I/O) devices 108, memory 116, a storage 114, and a network interface 106.

Computing device 100 includes a desktop computer, a laptop computer, a smart phone, a personal digital assistant (PDA), tablet computer, or any other type of computing device configured to receive input, process data, and optionally display images, and is suitable for practicing one or more embodiments. Computing device 100 described herein is illustrative and any other technically feasible configuration falls within the scope of the present disclosure.

Processing unit(s) 102 includes any suitable processor implemented as a central processing unit (CPU), a graphics processing unit (GPU), an application-specific integrated circuit (ASIC), a field programmable gate array (FPGA), an artificial intelligence (AI) accelerator, any other type of processing unit, or a combination of different processing units, such as a CPU configured to operate in conjunction with a GPU. In general, processing unit(s) 102 may be any technically feasible hardware unit capable of processing data and/or executing software applications. Further, in the context of this disclosure, the computing elements shown in computing device 100 may correspond to a physical computing system (e.g., a system in a data center) or may be a virtual computing instance executing within a computing cloud.

In one embodiment, I/O devices 108 include devices capable of providing input, such as a keyboard, a mouse, a touch-sensitive screen, and so forth, as well as devices capable of providing output, such as a display device. Additionally, I/O devices 108 may include devices capable of both receiving input and providing output, such as a touchscreen, a universal serial bus (USB) port, and so forth. I/O devices 108 may be configured to receive various types of input from an end-user (e.g., a designer) of computing device 100, and to also provide various types of output to the end-user of computing device 100, such as displayed digital images or digital videos or text. In some embodiments, one or more of I/O devices 108 are configured to couple computing device 100 to a network 110.

Network 110 includes any technically feasible type of communications network that allows data to be exchanged between computing device 100 and external entities or devices, such as a web server or another networked computing device. For example, network 110 may include a wide area network (WAN), a local area network (LAN), a wireless (WiFi) network, and/or the Internet, among others.

Storage 114 includes non-volatile storage for applications and data, and may include fixed or removable disk drives, flash memory devices, and CD-ROM, DVD-ROM, Blu-Ray, HD-DVD, or other magnetic, optical, or solid-state storage devices. Design engine 118 and data store 120 may be stored in storage 114 and loaded into memory 116 when executed.

Memory 116 includes a random-access memory (RAM) module, a flash memory unit, or any other type of memory unit or combination thereof. Processing unit(s) 102, I/O device interface 104, and network interface 106 are configured to read data from and write data to memory 116. Memory 116 includes various software programs that can be executed by processor(s) 102 and application data associated with said software programs, including design engine 118 and data store 120. Design engine 118 and data store 120 are described in further detail below with respect to FIG. 2.

In operation, design engine 118 is configured to generate and/or optimize the design of buildings, such as factories or other workplaces. Design engine 118 receives input from data store 120 describing various aspects of the building being designed, such as a site on which the building is to be built, operations to be performed in the building, and various other constraints and requirements for the building. Design engine 118 generates a spectrum of potential building designs based on the received input. Additionally or alternatively, in some embodiments design engine 118 receives one or more existing building designs for subsequent analysis and/or optimization. For example, in one such embodiment, design engine 118 receives an initial building design that design engine 118 employs to generate further potential designs based on the received input as described above. In another example, in one such embodiment, design engine 118 receives a plurality of building designs that are each explored in greater detail. In such an embodiment, each particular building design remains substantially fixed, and a plurality of permutations of the particular design are generated by design engine 118 so that the ventilation efficiency of each permutation can be quantified for subsequent evaluation.

A building design received or generated by design engine 118 may include for example, a building footprint; a layout of the building within a site, such as a location and/or orientation of the building in the site; and/or a building geometry that includes a floorplan and/or a three-dimensional (3D) model of the building. In some embodiments, a 3D model of a building includes a layout of rooms, systems, infrastructure, and/or other elements of the building; air inlet and air outlet sizes and locations; details of mechanical ventilation, such as exhaust fan and exhaust inlet locations; and/or details of mechanical cooling systems and associated ventilation.

Design engine 118 evaluates generated or received designs based on various criteria and uses the results of the evaluation to further optimize and refine the generated designs to produce additional building designs. More specifically, for a particular building design (or specific permutation of a particular building design), design engine 118 generates a 3D mesh based on a 3D building model associated with the particular building design. Design engine 118 then performs a computational fluid dynamic simulation using the 3D mesh to quantify ventilation efficiency of the building design (or the specific permutation of the particular building design). In some embodiments, design engine 118 generates one or more optimized building designs (or optimized permutations of a particular building design) based in part on the particular building design and on the quantified ventilation efficiency for that particular building design. Additionally, in some embodiments, design engine 118 presents the results of a ventilation efficiency evaluation to an end user.

Design engine 118 may be implemented as various software modules in order to generate and/or optimize building designs as described above. One embodiment of such software modules is described below in conjunction with FIG. 2.

Figure 2:
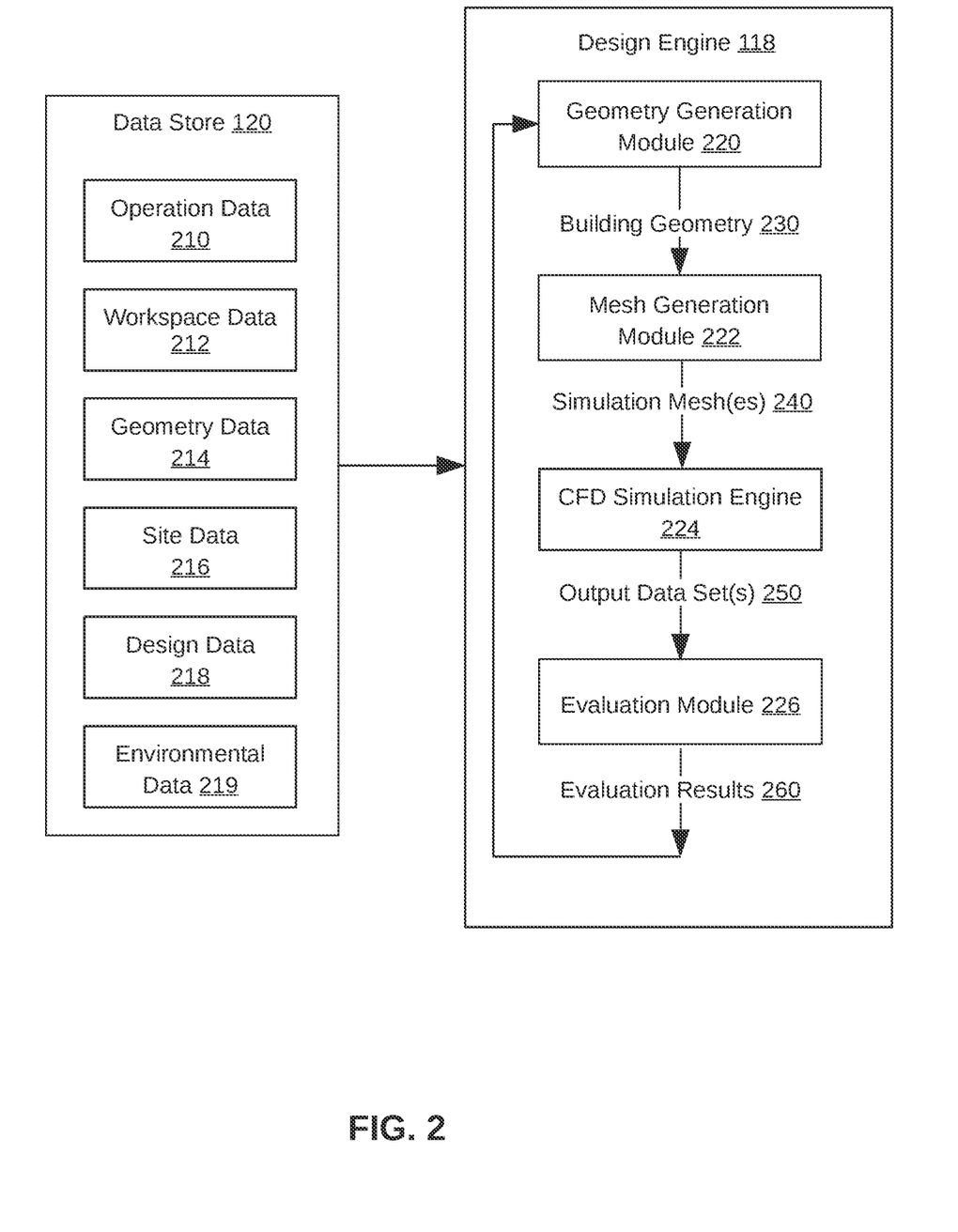
FIG. 2 is a more detailed illustration of the data store and design engine of FIG. 1, according to various embodiments of the present disclosure.

FIG. 2 is a more detailed illustration of design engine 118 and data store 120 of FIG. 1, according to various embodiments of the present disclosure. As shown, design engine 118 is coupled to data store 120 and includes, without limitation, a geometry generation module 220, a mesh generation module 222, a computational fluid dynamics (CFD) simulation engine 224, and an evaluation module 226.

In one or more embodiments, design engine 118 obtains data describing requirements and constraints associated with generating building designs for the building from data store 120. Additionally, in some embodiments, design engine 118 may store generated data to data store 120, such as building geometries, 3D building models, building layouts, and/or evaluation results (e.g., values for one or more ventilation performance metrics) associated with the ventilation efficiency of a particular building geometry, 3D building model, and/or building layout. As shown in FIG. 2, data store 120 includes, without limitation, operation data 210, workspace data 212, geometry data 214, site data 216, design data 218, and environmental data 219.

Operation data 210 includes data describing operations of the building. In some embodiments, data describing operations of a factory include data indicating numbers and types of workspaces (defined below), workstations, operators, personnel, schedules, zones, positions, tools, storage facilities, parts, materials, equipment, transport requirements or restrictions, and/or other elements and features associated with operations of the factory. Additionally or alternatively, in some embodiments, data describing operations of a workplace include data indicating numbers and/or sizes of office spaces, desks, meeting rooms, common areas, amenities such as restrooms or breakrooms, staff, office personnel, schedules, zones, equipment, space requirements or restrictions, and/or other elements and features associated with the workplace. Additionally or alternatively, in some embodiments, the data describing the workplace operations may include data describing the elements and features associated with the workplace, such as the number of offices, desks, common areas, and amenities.

Workspace data 212 includes data describing workstations or workspaces of the building. A workspace may generally refer to any defined space within the building, open or enclosed, for employees to perform work, such as a meeting room, office, group of desks, group of cubicles, warehouse space, manufacturing bay, and/or the like. In some embodiments, workspace data 212 describing a particular workstation include data indicating one or more operations associated with the workstation, one or more operation tasks associated with the workstation, dimensions of the workstation, a shape of the workstation, and/or other information related to the workstation. Additionally or alternatively, in some embodiments, workspace data 212 describing a workspace include data indicating one or more personnel types associated with the workspace, one or more categories or functions associated with the workspace, a shape of the workspace, dimensions of the workspace, a type and number of elements associated with the workspace such as desks, tables, and seating, and/or other information related to the workspace. In some embodiments, workspace data 212 describing a workspace includes ventilation requirements for specific workspaces, such as a minimum acceptable exhaust volume for the workspace, a minimum and/or maximum acceptable temperature for the workspace, and/or a minimum acceptable air change value for the workspace.

Geometry data 214 includes data describing the building. For example, the data describing the building include data indicating a size of the building, a shape of the building, a footprint of the building, an orientation of the building relative to the surrounding environment (e.g., relative to sun exposure and/or prevailing winds), structural elements of the building, fixed equipment within the building and locations of the fixed equipment, and/or infrastructure of the building such as loading docks, entrances, exits, and mechanical systems. In some embodiments, geometry data 214 includes a 3D model of the building, a wireframe model of the building, a surface mesh of the building, a footprint of the building, a floorplan of the building, images or renders of the building from one or more views, and/or other visualizations of the building geometry.

In some embodiments, geometry data 214 includes data indicating features of the building design that affect and/or contribute to natural ventilation, temperature of workspaces included in the building, and/or air changes of workspaces included in the building. Thus, in some embodiments, geometry data 214 includes information describing air inlets, air outlets, mechanical ventilation equipment, and/or mechanical cooling equipment. In some embodiments, geometry data 214 includes one or more of a size and location for each natural ventilation air inlet included in the building design; a size and a location for each natural ventilation air outlet included in the building design; an exhaust air removal capacity, an exhaust fan location, and/or one or more exhaust fan inlet locations for each exhaust fan included in the building design; a supply air volume and/or one or more supply air register locations for each mechanical cooling system included in the building design, and/or the like.

Alternatively, in some embodiments, features of the building design that affect and/or contribute to natural ventilation, temperature of workspaces, and/or air changes in the building are generated by geometry generation module 220. In such embodiments, geometry data 214 may not include information that describes air inlets, air outlets, mechanical ventilation equipment, and/or mechanical cooling equipment for a building design to be evaluated by design engine 118. However, in such embodiments, geometry data 214 may include such information for one or more building designs that have been previously evaluated by design engine 118. Thus, in such embodiments, building geometry 230 generated by geometry generation module 220 may be based in part on information that describes air inlets, air outlets, mechanical ventilation equipment, and/or mechanical cooling equipment for one or more building designs that have been previously evaluated by design engine 118.

In some embodiments, geometry data 214 includes data generated by design engine 118. In such embodiments, design engine 118 generates geometry data 214 for a building design based on other information describing the building, such as operation data 210 and/or workspace data 212. Additionally or alternatively, in some embodiments, some or all of geometry data 214 is generated by another application or tool, and/or is generated by a user. In such embodiments, design engine 118 receives geometry data 214 from data store 120 and/or from the application or tool.

Site data 216 includes data describing a site at which the building is to be constructed. For example, the data describing the site may include data indicating a location of the site, a size of the site, a shape of the site, an orientation of the site, fixed equipment within the site and locations of the fixed equipment, utilities around or underneath the site, topography of the site, elevation(s) of the site, soil conditions of the site, restriction(s) on the site, and infrastructure of the site such as roads and paths.

Design data 218 includes data associated with one or more designs of the building. For example, in some embodiments, data describing a building design include building size requirements, capacity requirements, infrastructure requirements, system requirements, accessibility requirements, architectural and engineering constraints, and so forth. In some embodiments, design data 218 include data describing materials associated with the building design, such as windows, doors, cladding, piping and plumbing types and sizes, wiring types and sizes, and mechanical systems such as heating, ventilation and air conditioning (HVAC) systems. In some embodiments, design data 218 includes information associated with one or more building designs that enables performing CFD simulations on the one or more building designs. Thus, in such embodiments, design data 218 include material property information for walls, windows, and/or doors used in a particular building design.

Environment data 219 include data associated with a specific site or location for one or more designs of the building. In some embodiments, environment data 219 includes information for one or more environment scenarios, which may each include specific values for ambient wind speed and direction, sun exposure, ambient air temperature, and the like. In some embodiments, environment data 219 include a plurality of environmental scenarios for a particular site or location for a building design, where each environmental scenarios assumes different ambient wind and sun exposure. Thus, in such embodiments, the ventilation efficiency of a particular permutation of a specific building design can be evaluated for multiple environmental scenarios.

In operation, geometry generation module 220 receives geometry data 214, site data 216, and/or design data 218 from data store 120 and generates a building geometry 230. Building geometry 230 includes a 3D building model of one or more building designs. Each 3D building model indicates the size and shape of a building design. Further, in some embodiments, a 3D building model included in building geometry 230 includes pertinent information associated with features of a particular building design that affect and/or contribute to natural ventilation, temperature of workspaces included in the building, and/or air changes of workspaces included in the building. Thus, in such embodiments, the 3D building model includes information such as sizes and locations of air inlets, air outlets, mechanical ventilation equipment, and/or mechanical cooling equipment.

In some embodiments, building geometry 230 includes a 3D building model for each of multiple permutations of a single basic building design. For example, for a single basic design, each of a plurality of permutations associated with the basic building design may include different locations and/or sizes of various ventilation-associated features, such as natural ventilation air inlets and outlets. Because airflow is affected by such ventilation-associated features, a different 3D building model with different sizes, quantities, and/or locations of such ventilation-associated features is included in building geometry 230. It is noted that, in some embodiments, the basic building designs and permutations thereof included in building geometry 230 are optimized designs or permutations generated by geometry generation module 220. One embodiment of a 3D building model is described below in conjunction with FIG. 3.

Figure 3:
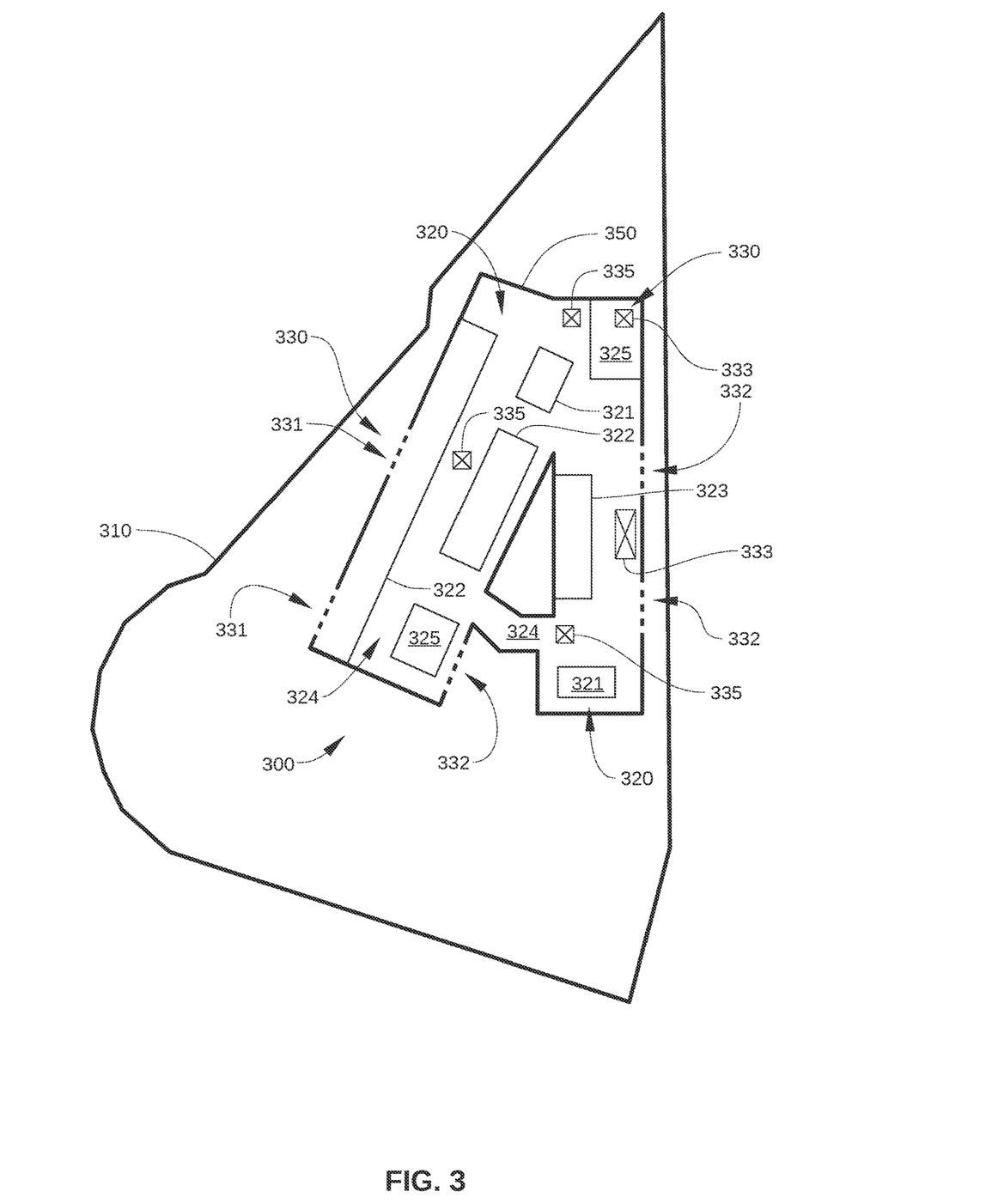
FIG. 3 is an exemplary illustration of a 3D building model, according to various embodiments of the present disclosure.

FIG. 3 schematically illustrates a 3D building model 300, according to various embodiments of the present disclosure. In the embodiment illustrated in FIG. 3, 3D building model 300 is shown positioned within a site 310 and includes layout details 320, ventilation-associated features 330, and a basic design 350. For clarity, in FIG. 3, 3D building model 300 is illustrated as a two-dimensional representation of a building design. In practice, 3D building model 300 is typically implemented as a three-dimensional solid model of a particular building design.

Layout details 320 include features of 3D building model 300 pertinent to the evaluation of the ventilation efficiency of 3D building model 300. In some embodiments, layout details 320 include, for example, conditioned spaces 321, high-ceiling factory regions 322, enclosed areas 323, corridors 324, and/or special regions 325 that have specific exhaust requirements.

Ventilation-associated features 330 include features that directly affect natural and mechanical ventilation of 3D building model 300. In some embodiments, ventilation-associated features 330 include, for example, natural ventilation air inlet openings 331, natural ventilation air outlet openings 332, exhaust fan inlet locations 333 for each exhaust fan included in the building design on which 3D building model is based, and/or supply air register locations 335 for each mechanical cooling system included in the building design on which 3D building model is based.

Taken together, layout details 320 and ventilation-associated features 330 of 3D building model 300 enable numerical simulations to be performed for quantifiably evaluating ventilation efficiency of 3D building model 300, for example by CFD simulation engine 224 (described below).

Basic design 350 of 3D building model 300 includes external walls 302 and, in some embodiments, a specific orientation of 3D building model within site 310. In some embodiments, for a single basic design 350, a plurality of 3D building models 300 can be generated that include the same basic design 350. In some embodiments, a particular basic design 350 is configured based on constraints unrelated to natural ventilation, such as construction cost, sustainability certification level, suitability for future expansion and/or transformation, quality of employee working conditions, and the like. In such embodiments, each of the plurality of 3D building models 300 that is based on the same basic design 350 can be considered a different permutation of that basic design 350. For example, in some embodiments, each such permutation includes a different configuration of layout details 320, ventilation-associated features 330, or a combination of both. Thus, a plurality of permutations can be numerically evaluated for a single basic design 350.

Returning to FIG. 2, it is noted that the placement of a building design within a site can affect ventilation efficiency, due to the different interactions that occur between the environment surrounding a building and the orientation of the building. Thus, in some embodiments, building geometry 230 also indicates a placement of the building design within the site, such as location and/or orientation of the building design on the site. Further, in some embodiments, for a particular building design or permutation of a building design, building geometry 230 includes multiple orientations of the building design in the site. In such embodiments, for a single building design or permutation of a building design, evaluation of ventilation efficiency can be performed once for each such orientation of the building design on the site.

Mesh generation module 222 receives building geometry 230 and, based on building geometry 230, generates a 3D mesh 240 for each of the one or more 3D building models included in building geometry 230. Mesh generation module 222 can be implemented with any conventional algorithm to covert the solid 3D building model to a 3D simulation mesh 240 that is suitable for performing CFD simulations. One embodiment of a simulation mesh 240 is described below in conjunction with FIG. 4.

Figure 4:
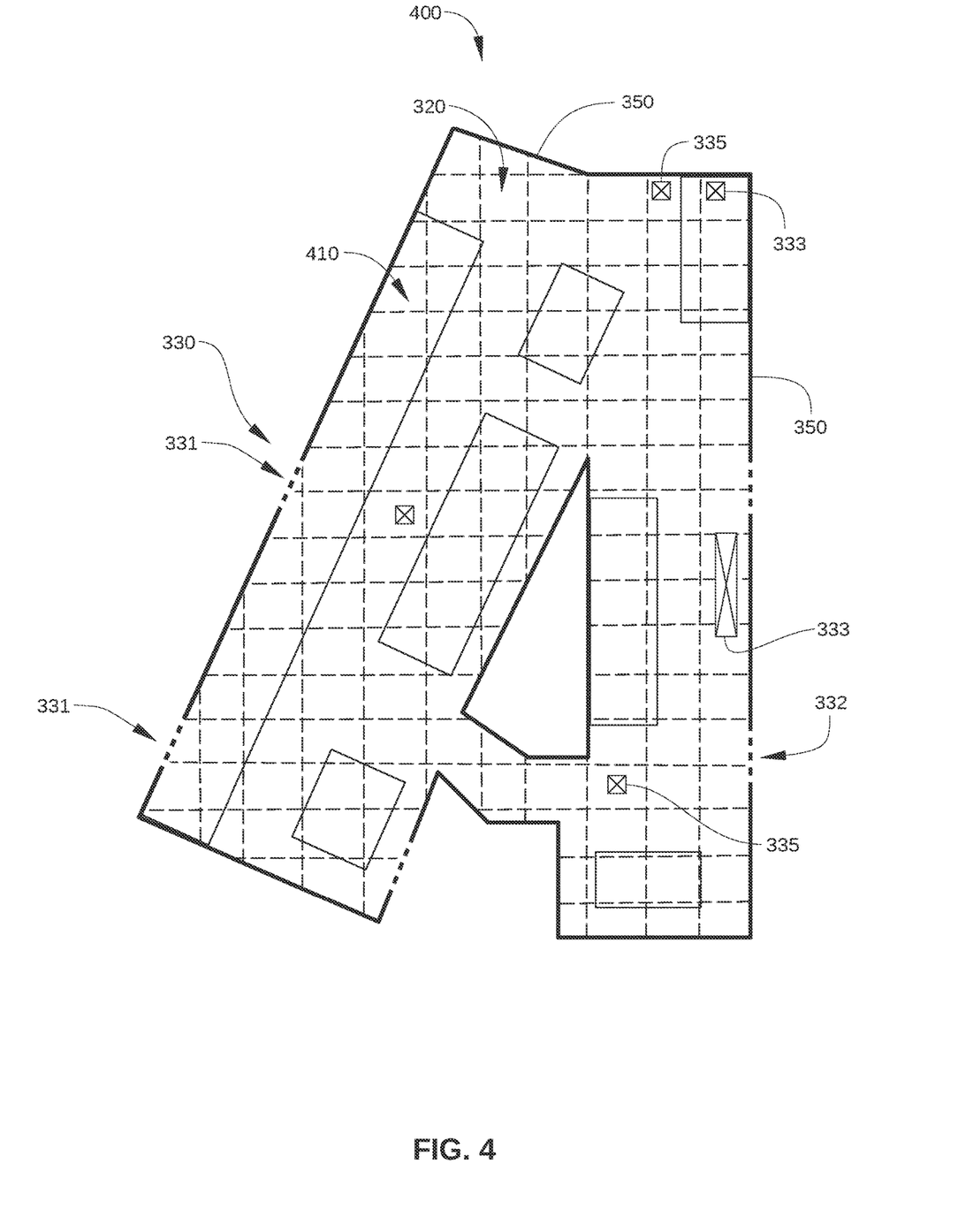
FIG. 4 is an exemplary illustration of a simulation mesh generated from the 3D building model of FIG. 3, according to various embodiments of the present disclosure.

FIG. 4 schematically illustrates a simulation mesh 400, according to various embodiments of the present disclosure. Simulation mesh 400 includes a plurality of mesh elements 410 that are disposed within and, in some embodiments, outside of a building boundary 420. Building boundary 420 generally corresponds to an outer skin of a building represented by the 3D building model associated with simulation mesh 400. To more accurately simulate the effect of environmental factors, such as wind, simulation mesh 400 may include mesh elements 410 that are disposed outside building boundary 420. For clarity, in the embodiment illustrated in FIG. 4, mesh elements 410 are only shown within building boundary 420. Although depicted as a two-dimensional representation of a 3D building model in FIG. 4, simulation mesh 400 is typically implemented as a 3D mesh. In some embodiments, simulation mesh further includes finite elements (not shown) for numerical simulation of heat transfer associated with building boundary 420.

Mesh elements 410 can be any suitable shape or size for facilitating computational fluid dynamic simulations of air flow into, out of, and within building boundary 420. In the embodiment illustrated in FIG. 4, mesh elements 410 are uniform in size and cubic in shape. In other embodiments, mesh elements can be different sizes in different regions of simulation mesh 400 and/or can include various shapes. Simulation mesh 400 can be a structured mesh, an unstructured mesh, or include portions of structured mesh and portions of unstructured mesh.

Simulation mesh 400 typically includes one or more layout details 320 that can affect airflow within building boundary 420 and/or ventilation-associated features 330 that directly affect airflow within building boundary 420, such as natural ventilation air inlet openings 331, natural ventilation air outlet openings 332, exhaust fan inlet locations 333 and/or supply air register locations 335. In some embodiments, ventilation-associated features 330 are represented as sources or sinks in simulation mesh 400.

Returning to FIG. 2, CFD simulation engine 224 receives one or more simulation meshes 240 and performs a numerical simulation of air flow for each of the one or more simulation meshes 240 to generate a corresponding output data set 250. As noted above, each simulation mesh 240 is associated with a different 3D building model/permutation. Therefore, each output data set 250 is associated with a different 3D building model/permutation, each of which can be evaluated based on the data included in a corresponding output data set 250. In some embodiments, each output data set 250 includes an air temperature and/or an air velocity value for each point in a point cloud disposed within a specific 3D building model or permutation of building model. In some embodiments, an output data set 250 is limited to user-occupied regions within a specific 3D building model and excludes regions within the the 3D building model that are not user-occupied. For example, regions within the 3D building model that are greater than about six feet above a floor or stairway cannot typically be occupied by a user, and therefore in such embodiments, numerical simulation data associated with such regions are not included in output data set 250.

In some embodiments, CFD simulation engine 224 performs the numerical simulation of air flow for a particular simulation mesh 240 based on a certain set of environmental data 219, such as a specific environmental scenario. For example, a specific environmental scenario may include a specific combination of wind direction and magnitude, air temperature, air humidity, and/or sun exposure. Further, in some embodiments, CFD simulation engine 224 performs multiple numerical simulations of air flow for a simulation mesh 240 based on multiple different environmental scenarios.

Evaluation module 226 receives one or more output data sets 250 and quantifies a ventilation efficiency for each 3D building model associated with one of the output data sets 250. Specifically, evaluation module 226 determines an evaluation result 260 for each 3D building model associated with one of the output data sets 250. In some embodiments, the evaluation result 260 is based on the air temperature and/or an air velocity value for each point in a point cloud of an output data set 250 for a specific 3D building model or permutation of a 3D building model. In some embodiments, an evaluation result 260 includes a value for a ventilation performance metric that is associated with the 3D building model. In some embodiments, the ventilation performance metric is based on at least one of an air changes calculation, an air temperature calculation, an air velocity calculation, a comfort metric calculation, and/or an energy consumption calculation for the 3D building model, as described below. In some embodiments, for a specific 3D building model or permutation of a 3D building model, a different value for a ventilation performance metric is determined for each of multiple environmental scenarios that have been simulated by CFD simulation engine 224 for the 3D building model.

In some embodiments, an air changes calculation performed by evaluation module 226 determines a number of air changes (for example, per hour) for certain regions within the 3D building model associated with an output data set 250. In some embodiments, a total number of air changes is calculated for all user-occupied regions of the 3D building model associated with the output data set 250. In such embodiments, the user-occupied regions are considered a single volume. In such embodiments, the user-occupied regions may include floor-level regions of the 3D building model and exclude other regions of the building model.

In some embodiments, a number of air changes is calculated separately for different user-occupied regions of the 3D building model. In such embodiments, prior to being combined into the single air change value, the separately calculated air change values for each user-occupied region can be weighted based on a level of user occupancy of each user-occupied region, work performed in each user-occupied region, and/or some other factor that varies between the user-occupied regions. For example, in one such embodiment, the air change value for a region that has a high level of user occupancy is weighted more heavily than the air change value for a region with low user occupancy. In some embodiments, the separately calculated air change values for each user-occupied region can then be combined into a single air change value for the 3D building model.

In some embodiments, the air changes calculation performed by evaluation module 226 determines in which portions of the user-occupied regions in the 3D building model a targeted minimum quantity of air changes takes place. Thus, in such embodiments, portions of the user-occupied regions in the 3D building model that fall outside a threshold range of comfort for users are determined.

In some embodiments, the air temperature calculation performed by evaluation module 226 determines an air temperature for certain regions within the 3D building model associated with an output data set 250. In some embodiments, the air temperature is calculated for all user-occupied regions of the 3D building model associated with the output data set 250. In such embodiments, the user-occupied regions are considered a single volume and an average temperature is calculated for the single volume. In such embodiments, the user-occupied regions may include floor-level regions of the 3D building model and exclude other regions of the building model.

In some embodiments, the air temperature is calculated separately for different user-occupied regions of the 3D building model. In such embodiments, prior to being combined into the single air temperature value, the separately calculated air temperature values for each user-occupied region can be weighted based on a level of user occupancy of each user-occupied region, work performed in each user-occupied region, and/or some other factor that varies between the user-occupied regions. In some embodiments, the separately calculated air temperature values for each user-occupied region can then be combined into a single air temperature value for the 3D building model.

In some embodiments, an air temperature calculation performed by evaluation module 226 determines in which portions of the user-occupied regions in the 3D building model air temperature does not fall within a threshold comfortable temperature range. Thus, in such embodiments, portions of the user-occupied regions in the 3D building model are determined in which air temperatures are predicted to be uncomfortably high air or low.

In some embodiments, an air velocity calculation performed by evaluation module 226 determines an average air velocity for certain regions within the 3D building model associated with an output data set 250. For example, in some embodiments, an average air velocity is calculated for all user-occupied regions of the 3D building model. In such embodiments, the user-occupied regions are considered a single volume. In such embodiments, the user-occupied regions may include floor-level regions of the 3D building model and exclude other regions of the building model.

In some embodiments, an average air velocity is calculated separately for different user-occupied regions of the 3D building model. In such embodiments, prior to being combined into the single air velocity value, the separately calculated air change values for each user-occupied region can be weighted based on a level of user occupancy of each user-occupied region, work performed in each user-occupied region, and/or some other factor that varies between the user-occupied regions. In some embodiments, the separately calculated air velocity values for each user-occupied region can then be combined into a single air velocity value for the 3D building model.

In some embodiments, the air velocity calculation performed by evaluation module 226 determines in which portions of the user-occupied regions in the 3D building model air velocity does not fall within a threshold comfortable temperature range. Thus, in such embodiments, portions of the user-occupied regions in the 3D building model are determined in which uncomfortably high air velocities and/or stagnant air spaces are present.

In some embodiments, a comfort metric calculation performed by evaluation module 226 determines a value for one or more comfort metrics for the 3D building model associated with an output data set 250. In some embodiments, a value for each of the one or more comfort metrics is based on one or more values generated by the above-described air changes calculation, air temperature calculation, and/or air velocity calculation for the 3D building model. In some embodiments, a single value for an overall comfort metric for a particular 3D building model is generated. In such embodiments, the single value for the overall comfort metric for a particular 3D building model facilitates evaluating the ventilation performance of a large number of different building designs and/or building design permutations with respect to user comfort. Additionally or alternatively, in some embodiments, values for multiple different comfort metrics for a particular 3D building model are generated by evaluation module 226. For example, in such embodiments, a different comfort metric may be associated with an air changes calculation, an air temperature calculation, and/or an air velocity calculation. In such embodiments, a more nuanced evaluation the ventilation performance of different 3D building models is facilitated.

In some embodiments, an energy consumption calculation performed by evaluation module 226 determines an energy consumption value for the 3D building model associated with an output data set 250. In such embodiments, the energy consumption value for a particular 3D building model facilitates evaluation of the ventilation performance of a large number of different building designs and/or building design permutations with respect to energy consumption.

After evaluation module 226 generates evaluation result 260, design engine 118 can then generate additional building geometries 230, via geometry generation module 220. For example, in some embodiments, evaluation module 226 provides evaluation results 260 to geometry generation module 220 for a further iteration of optimizing building geometry 230. Based on the evaluation results 260, geometry generation module 220 may repeat the geometry generation procedure described herein with input parameters varied according to evaluation results 260. Thus, in some embodiments, subsequently generated building geometries 230 are based at least in part on evaluation results 260 and previously evaluated building geometries 230. As note above, the evaluation results 260 can include values for one or more ventilation performance metrics that are based on at least one of an air changes calculation, an air temperature calculation, an air velocity calculation, a comfort metric calculation, and/or an energy consumption calculation for a particular 3D building model.

In some embodiments, design engine 118 generates an interactive graphical user interface (GUI) that depicts the various analyses performed and the evaluation results 260 generated by the various analyses, and displays the GUI to the end user. Additionally, the GUI may depict one or more of a visualization of the building geometry 230, a visualization of the building layout 240, and/or the evaluation results 260.

In some embodiments, design engine 118 generates a plurality of building designs and the GUI depicts evaluation results, metrics, and visualizations corresponding to each building design of the plurality of building designs. This allows an end user to quickly view and compare metrics and evaluation results across several potential building designs generated by the design engine 118. Additionally, the GUI may include tools for searching, filtering, and/or sorting the plurality of building designs. For example, a user may interact with the GUI to identify building designs that satisfy a particular design criteria.

Figure 5:
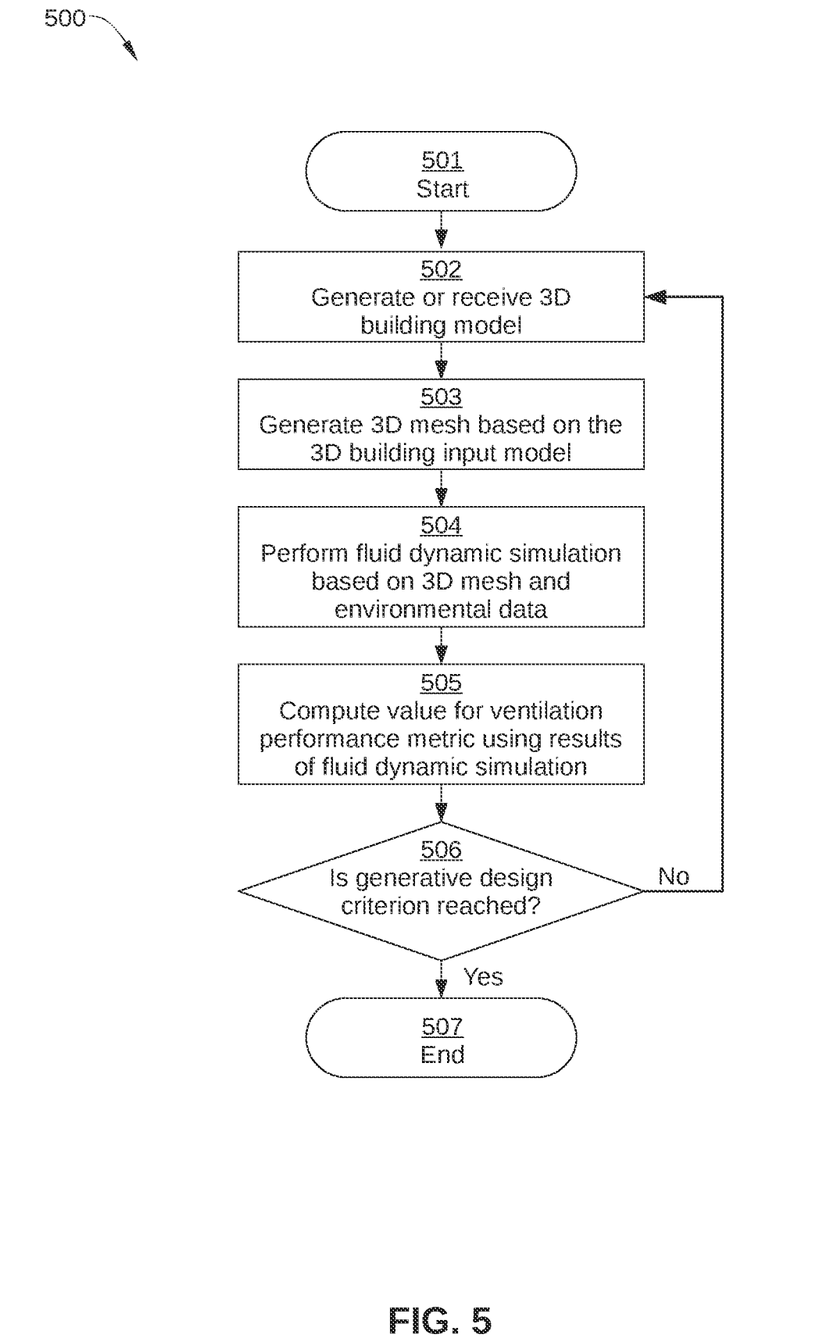
FIG. 5 sets forth a flowchart of method steps for computationally determining the ventilation efficiency of a building design, according to various embodiments.

FIG. 5 sets forth a flowchart of method steps for computationally determining ventilation efficiency of a building design, according to various embodiments. Although the method steps are described in conjunction with the systems of FIGS. 1-5, persons skilled in the art will understand that any system configured to perform the method steps, in any order, is within the scope of the embodiments.

As shown, a method 500 begins at step 501, where design engine 118 begins a computational process of determining ventilation efficiency of one or more building designs.

In step 502, design engine 118 generates or receives one or more 3D building models. As noted above, in some instances, design engine 118 generates, via geometry generation module 220, one or more 3D building models based on one or more previously evaluated 3D building models and on evaluation results 260 associated with the previously evaluated 3D building model. In some embodiments, design engine 118 generates a plurality of 3D building models in step 502. For example, in one such embodiment, for a single basic design 350, design engine 118 generates a plurality of different 3D building models that each correspond to a different permutation of the basic design 350. In such an embodiment, each permutation corresponds to a different configuration of ventilation-associated features 330 and/or layout details 320 in the basic design 350.

In some embodiments, in step 502, design engine 118 selects an existing 3D building model. In one such embodiment, in one iteration of method 500, design engine 118 evaluates one or more permutations of a first basic design 350, and in a second iteration of method 500, design engine 118 evaluates one or more permutations of a second basic design 350. Thus, in the embodiment, design engine 118 may select a different existing 3D building model to evaluate at each iteration of step 502.

In step 503, design engine 118 generates, via mesh generation module 222, a different 3D simulation mesh 240 based on each 3D building model generated in step 502. Thus, for each permutation of a basic design 350 being considered, design engine 118 generates a different simulation mesh 240 that represents a different configuration of ventilation-associated features 330 and/or layout details 320.

In step 504, design engine 118 performs, via CFD simulation engine 224, a fluid dynamic simulation for each simulation mesh 240 generated in step 503. In some embodiments, each simulation is further based on certain environmental data 219. In some embodiments, more than one environmental scenario is simulated for a single simulation mesh 240. Thus, in such embodiments, multiple fluid dynamic simulations are performed in step 504 for a single simulation mesh 240.

In step 505, design engine 118 computes a value of one or more ventilation performance metrics for each simulation performed in step 504. Thus, design engine 118 computes at least one value of a ventilation performance for each 3D building model selected or generated in step 502.

In step 505, design engine 118 determines whether a predetermined generative design criterion has been satisfied. Examples of suitable generative design criteria include a maximum number of iterations of steps 502-505 to be performed, a predetermined number of existing designs to be evaluated, a predetermined number of 3D building models having a value for a ventilation performance metrics that exceeds a specific threshold, and the like.

When design engine 118 determines that a predetermined generative design criterion has been satisfied, method 500 proceeds to step 507 and ends. When design engine 118 determines that a predetermined generative design criterion has not been satisfied, method 500 returns to step 502.

In sum, techniques are provided for analyzing airflow and energy consumption of building designs. A computer system generates or receives a 3D building model corresponding to a particular building design. Based on the 3D building model, the computer system generates a simulation mesh for performing a numerical simulation of airflow and heat transfer associated with the building design. The computer system generates a value for a ventilation performance metric for the 3D building model based on the numerical simulation. The ventilation performance metric is based on one or more of an air changes calculation, an air temperature calculation, an air velocity calculation, a comfort metric calculation, and/or an energy consumption calculation for the 3D building model. The comfort metric calculation may indicate an amount of floor area of the 3D building model that is within a threshold range of comfort.

At least one technical advantage of the disclosed techniques relative to the prior art is that the disclosed techniques can be incorporated into a CAD application to enable the CAD application to automatically explore a design space to identify regions where the ventilation efficiency of a building is optimized against other performance metrics for the building. Accordingly, with the disclosed techniques, a CAD application can generate a substantially larger number of building designs that, for example, increase both the natural ventilation within the building and the overall energy efficiency of the building, relative to a conventional CAD application. This functionality, which is not available in conventional CAD applications, increases the likelihood that an optimal ventilation system design can be automatically generated and identified for a given building design. These technical advantages represent one or more tangible and meaningful technological improvements over conventional CAD applications.

1. In some embodiments, a computer-implemented method for computationally determining ventilation efficiency when generating a building design comprises: generating a first three-dimensional (3D) mesh based on a first 3D building model; performing a first fluid dynamic computer simulation based on the first 3D mesh and first environmental data associated with the first 3D building model to generate a first output data set; and computing, based on the first output data set, a first value for a ventilation performance metric that is associated with the first 3D building model.

2. The computer-implemented method of clause 1, wherein the first 3D building model comprises an existing 3D building model.

3. The computer-implemented method of clauses 1 or 2, further comprising automatically performing one or more computer-based additional operations on the first 3D building model based on the ventilation performance metric associated with the first 3D building model to generate an optimized 3D building model.

4. The computer-implemented method of any of clauses 1-3, further comprising: generating a second 3D mesh based on the optimized 3D building model; performing a second fluid dynamic computer simulation based on the second 3D mesh and the first environmental data to generate a second output data set; and computing, based on the second output data set, a second value for the ventilation performance metric that is associated with the optimized 3D building model.

5. The computer-implemented method of any of clauses 1-4, wherein automatically performing the one or more computer-based additional operations on the first 3D building model comprises modifying at least one ventilation-associated feature included in the first 3D building model.

6. The computer-implemented method of any of clauses 1-5, wherein the at least one ventilation-associated feature comprises at least one of an air inlet size, an air inlet location, an air outlet size, an air outlet location, an exhaust air removal capacity, a number of exhaust fans, an exhaust fan inlet location, a supply air volume, or a supply air register location.

7. The computer-implemented method of any of clauses 1-6, wherein computing the first value for the ventilation performance metric comprises performing at least one of an air changes calculation, an air temperature calculation, an air velocity calculation, or a comfort value calculation.

8. The computer-implemented method of any of clauses 1-7, wherein performing the comfort value calculation comprises performing at least one of the air changes calculation, the air temperature calculation, or the air velocity calculation.

9. The computer-implemented method of any of clauses 1-8, wherein the first value of the ventilation performance metric is computed based only on user-occupied regions within the first 3D building model.

10. The computer-implemented method of any of clauses 1-9, wherein the user-occupied regions comprise floor-level portions of the first 3D building model.

11. In some embodiments, one or more non-transitory computer readable storage media store instructions that, when executed by one or more processors, cause the one or more processors to perform the steps of: generating a first three-dimensional (3D) mesh based on a first 3D building model; performing a first fluid dynamic computer simulation based on the first 3D mesh and first environmental data associated with the first 3D building model to generate a first output data set; and computing, based on the first output data set, a first value for a ventilation performance metric that is associated with the first 3D building model.

12. The one or more non-transitory computer readable storage media of clause 11, further comprising performing a second fluid dynamic computer simulation based on the first 3D mesh and second environmental data associated with the first 3D building model to generate a second output data set.

13. The one or more non-transitory computer readable storage media of clauses 11 or 12, wherein computing the first value for the ventilation performance metric comprises performing an air changes calculation using the first output data set and performing the air changes calculation using the second output data set.

14. The one or more non-transitory computer readable storage media of any of clauses 11-13, wherein computing the first value for the ventilation performance metric comprises performing a temperature calculation using the first output data set and performing the temperature calculation using the second output data set.

15. The one or more non-transitory computer readable storage media of any of clauses 11-14, further comprising generating the first 3D building model based on a second 3D building model and a second value for the ventilation performance metric that is associated with the second 3D building model.

16. The one or more non-transitory computer readable storage media of any of clauses 11-15, further comprising automatically performing one or more computer-based additional operations on the first 3D building model based on the ventilation performance metric associated with the first 3D building model to generate an optimized 3D building model.

17. The one or more non-transitory computer readable storage media of any of clauses 11-16, further comprising: generating a second 3D mesh based on the optimized 3D building model; performing a second fluid dynamic computer simulation based on the second 3D mesh and the first environmental data to generate a second output data set; and computing, based on the second output data set, a second value for the ventilation performance metric that is associated with the optimized 3D building model.

18. The one or more non-transitory computer readable storage media of any of clauses 1-17, wherein automatically performing the one or more computer-based additional operations on the first 3D building model comprises modifying at least one ventilation-associated feature included in the first 3D building model.

19. The one or more non-transitory computer readable storage media of any of clauses 1-18, wherein the at least one ventilation-associated feature comprises at least one of an air inlet size, an air inlet location, an air outlet size, an air outlet location, an exhaust air removal capacity, a number of exhaust fans, an exhaust fan inlet location, a supply air volume, or a supply air register location.

20. In some embodiments, a computer system comprises: a memory; and a one or more processors configured to: generate a first three-dimensional (3D) mesh based on a first 3D building model; perform a first fluid dynamic computer simulation based on the first 3D mesh and first environmental data associated with the first 3D building model to generate a first output data set; and compute, based on the first output data set, a first value for a ventilation performance metric that is associated with the first 3D building model.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module," a "system," or a "computer." In addition, any hardware and/or software technique, process, function, component, engine, module, or system described in the present disclosure may be implemented as a circuit or set of circuits.

Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for computationally determining ventilation efficiency when generating a building design, the method comprising:
   generating a first three-dimensional (3D) mesh based on a first 3D building model, wherein the 3D mesh includes one or more mesh elements that reside inside the first 3D building model and one or more mesh elements that reside outside the first 3D building model;
   performing a first fluid dynamic computer simulation based on the first 3D mesh and first environmental data associated with the first 3D building model to generate a first output data set; and
   computing, based on the first output data set, a first value for a ventilation performance metric that is associated with the first 3D building model, wherein the first value for the ventilation performance metric indicates one or more portions of the first 3D building model that can be occupied by a user within a first height of a floor level and that meet at least a first threshold criterion.

2. The computer-implemented method of claim 1, wherein the first 3D building model comprises an existing 3D building model.

3. The computer-implemented method of claim 1, further comprising automatically performing one or more computer-based additional operations on the first 3D building model based on the ventilation performance metric associated with the first 3D building model to generate an optimized 3D building model.

4. The computer-implemented method of claim 3, further comprising:
   generating a second 3D mesh based on the optimized 3D building model;
   performing a second fluid dynamic computer simulation based on the second 3D mesh and the first environmental data to generate a second output data set; and
   computing, based on the second output data set, a second value for the ventilation performance metric that is associated with the optimized 3D building model.

5. The computer-implemented method of claim 3, wherein automatically performing the one or more computer-based additional operations on the first 3D building model comprises modifying at least one ventilation-associated feature included in the first 3D building model.

6. The computer-implemented method of claim 5, wherein the at least one ventilation-associated feature comprises at least one of an air inlet size, an air inlet location, an air outlet size, an air outlet location, an exhaust air removal capacity, a number of exhaust fans, an exhaust fan inlet location, a supply air volume, or a supply air register location.

7. The computer-implemented method of claim 1, wherein computing the first value for the ventilation performance metric comprises performing at least one of an air changes calculation, an air temperature calculation, an air velocity calculation, or a comfort value calculation.

8. The computer-implemented method of claim 7, wherein performing the comfort value calculation comprises performing at least one of the air changes calculation, the air temperature calculation, or the air velocity calculation.

9. The computer-implemented method of claim 7, wherein the first value of the ventilation performance metric is computed based only on user-occupied regions within the first 3D building model.

10. The computer-implemented method of claim 9, wherein the user-occupied regions comprise floor-level portions of the first 3D building model.

11. One or more non-transitory computer readable storage media storing instructions that, when executed by one or more processors, cause the one or more processors to perform the steps of:
generating a first three-dimensional (3D) mesh based on a first 3D building model, wherein the 3D mesh includes one or more mesh elements that reside inside the first 3D building model and one or more mesh elements that reside outside the first 3D building model;
performing a first fluid dynamic computer simulation based on the first 3D mesh and first environmental data associated with the first 3D building model to generate a first output data set; and
computing, based on the first output data set, a first value for a ventilation performance metric that is associated with the first 3D building model, wherein the first value for the ventilation performance metric indicates one or more portions of the first 3D building model that can be occupied by a user within a first height of a floor level and that meet at least a first threshold criterion.

12. The one or more non-transitory computer readable storage media of claim 11, further comprising performing a second fluid dynamic computer simulation based on the first 3D mesh and second environmental data associated with the first 3D building model to generate a second output data set.

13. The one or more non-transitory computer readable storage media of claim 12, wherein computing the first value for the ventilation performance metric comprises performing an air changes calculation using the first output data set and performing the air changes calculation using the second output data set.

14. The one or more non-transitory computer readable storage media of claim 12, wherein computing the first value for the ventilation performance metric comprises performing a temperature calculation using the first output data set and performing the temperature calculation using the second output data set.

15. The one or more non-transitory computer readable storage media of claim 11, further comprising generating the first 3D building model based on a second 3D building model and a second value for the ventilation performance metric that is associated with the second 3D building model.

16. The one or more non-transitory computer readable storage media of claim 11, further comprising automatically performing one or more computer-based additional operations on the first 3D building model based on the ventilation performance metric associated with the first 3D building model to generate an optimized 3D building model.

17. The one or more non-transitory computer readable storage media of claim 16, further comprising:
generating a second 3D mesh based on the optimized 3D building model;
performing a second fluid dynamic computer simulation based on the second 3D mesh and the first environmental data to generate a second output data set; and
computing, based on the second output data set, a second value for the ventilation performance metric that is associated with the optimized 3D building model.

18. The one or more non-transitory computer readable storage media of claim 16, wherein automatically performing the one or more computer-based additional operations on the first 3D building model comprises modifying at least one ventilation-associated feature included in the first 3D building model.

19. The one or more non-transitory computer readable storage media of claim 18, wherein the at least one ventilation-associated feature comprises at least one of an air inlet size, an air inlet location, an air outlet size, an air outlet location, an exhaust air removal capacity, a number of exhaust fans, an exhaust fan inlet location, a supply air volume, or a supply air register location.

20. A computer system, comprising:
a memory; and
a one or more processors configured to:
generate a first three-dimensional (3D) mesh based on a first 3D building model, wherein the 3D mesh includes one or more mesh elements that reside inside the first 3D building model and one or more mesh elements that reside outside the first 3D building model;
perform a first fluid dynamic computer simulation based on the first 3D mesh and first environmental data associated with the first 3D building model to generate a first output data set; and
compute, based on the first output data set, a first value for a ventilation performance metric that is associated with the first 3D building model, wherein the first value for the ventilation performance metric indicates one or more portions of the first 3D building model that can be occupied by a user within a first height of a floor level and that meet at least a first threshold criterion.

\* \* \* \* \*